B. W. GADDIS.
VOTING MACHINE.
APPLICATION FILED OCT. 15, 1917.

1,304,555.

Patented May 27, 1919.
6 SHEETS—SHEET 1.

B. W. GADDIS.
VOTING MACHINE.
APPLICATION FILED OCT. 15, 1917.
1,304,555.
Patented May 27, 1919.
6 SHEETS—SHEET 4.
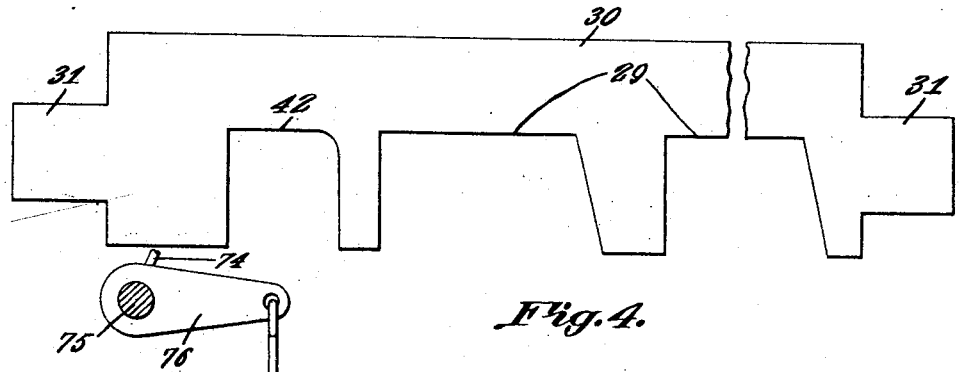
Fig. 4.
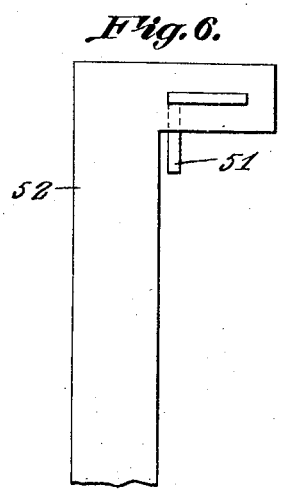
Fig. 6.
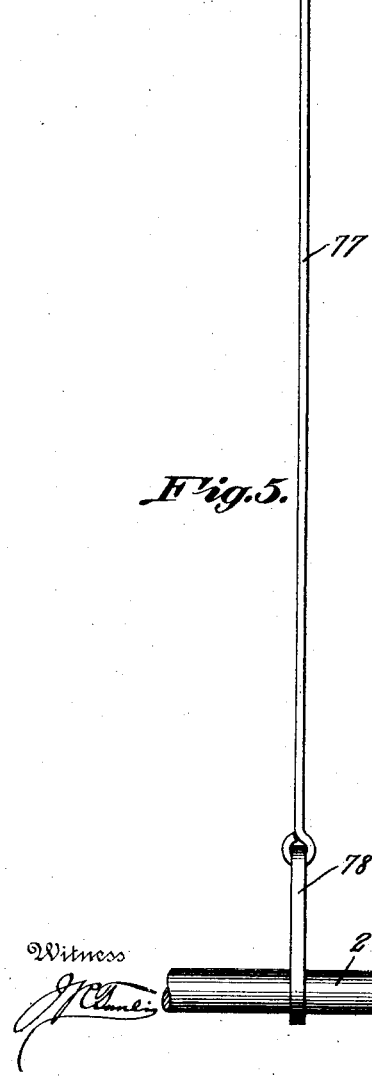
Fig. 5.
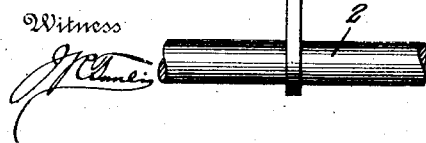
Witness
B. W. Gaddis, Inventor
By C. A. Snow & Co.
Attorneys

B. W. GADDIS.
VOTING MACHINE.
APPLICATION FILED OCT. 15, 1917.

1,304,555.

Patented May 27, 1919.
6 SHEETS—SHEET 5.

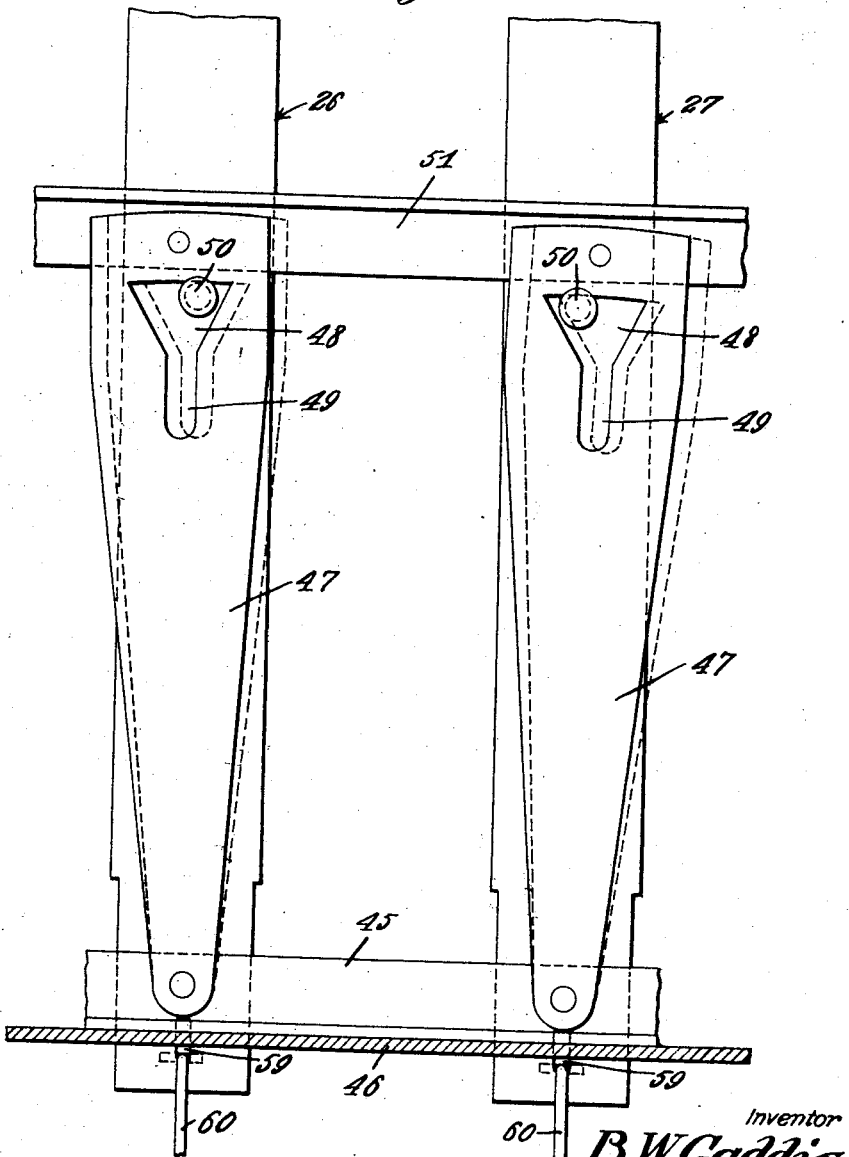

UNITED STATES PATENT OFFICE.

BENJAMIN W. GADDIS, OF PARSONS, KANSAS.

VOTING-MACHINE.

1,304,555.　　　　Specification of Letters Patent.　　Patented May 27, 1919.

Application filed October 15, 1917. Serial No. 196,727.

*To all whom it may concern:*

Be it known that I, BENJAMIN W. GADDIS, a citizen of the United States, residing at Parsons, in the county of Labette and State of Kansas, have invented a new and useful Voting-Machine, of which the following is a specification.

The subject of this invention is a voting machine wherein automatic locking devices and registers are coöperatively associated with resiliently retracted plungers, and the objects of the invention are first, to provide lever set locking mechanism, second, to provide manually set plunger actuated mechanism for controlling the action of the device, third to provide means for voting tickets in various ways, fourth, to provide indicators to register the number and kinds of votes cast, fifth, to provide means for preventing repeating, sixth, to provide a simple and efficient voting machine.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made without departing from the spirit of the invention.

One practical embodiment of my invention is shown in the accompanying drawings, wherein:—

Fig. 4 is a detail side elevation of a locking bar;

Fig. 5 is a detail view in elevation of the connection between the control lever shaft and the locking shaft for special plungers;

Fig. 6 is a broken detail showing the support for a sliding bar in side elevation.

Fig. 8 is a broken detail showing the main plunger locks in rear elevation.

Figure 1:
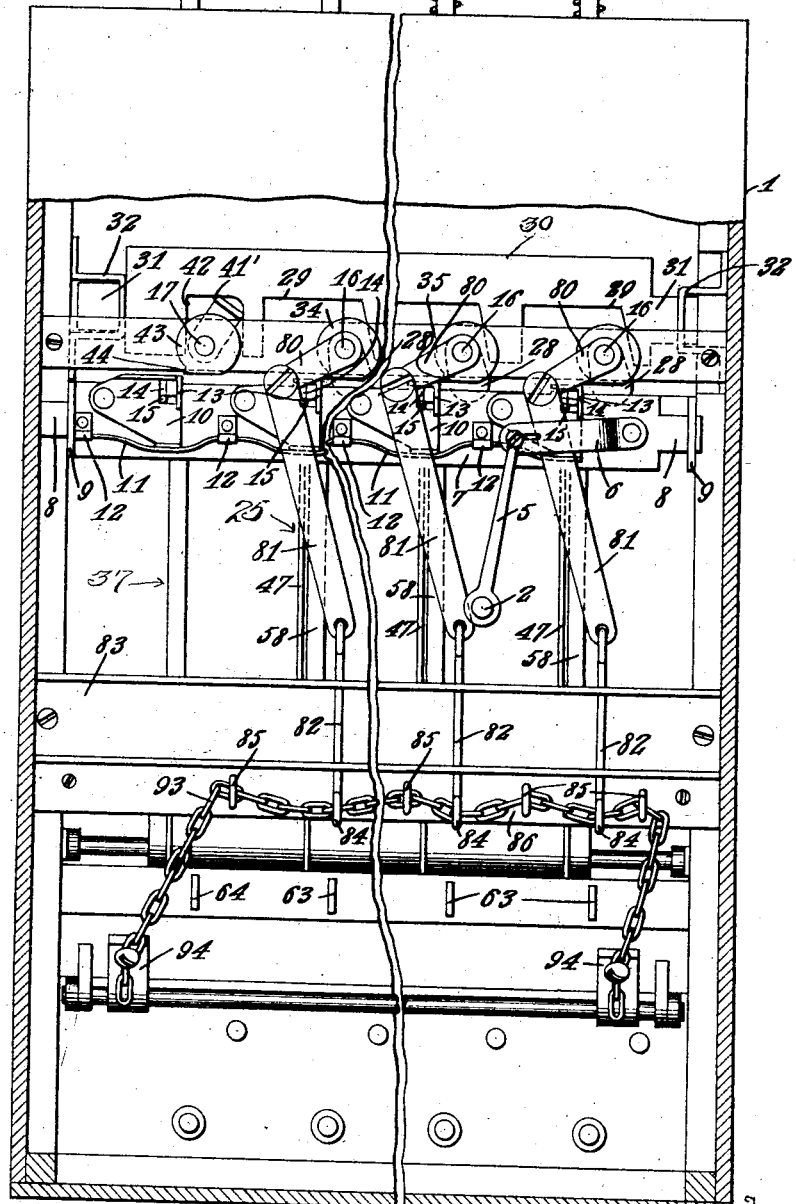
Figure 1 is a side elevation of a voting machine constructed in accordance with my invention, with portions broken away.

Referring to the drawings by numerals:

In carrying out my invention I provide a voting machine consisting of a main structure which is utilized in voting a general ticket, either straight or split, and two auxiliary parts; one utilized in conjunction with the main structure for voting on local issues pertaining only to the particular State in which the voter resides; and the other operating in conjunction with the main structure and used in voting at primary elections where local officers are to be chosen in the particular locality. For the purpose of clearness, therefore, the main structure will first be described, then the auxiliary structures in the order set forth.

The mechanism constituting the device may be inclosed in a suitable casing of irregular shape, which casing is indicated by the numeral 1.

Figure 2:
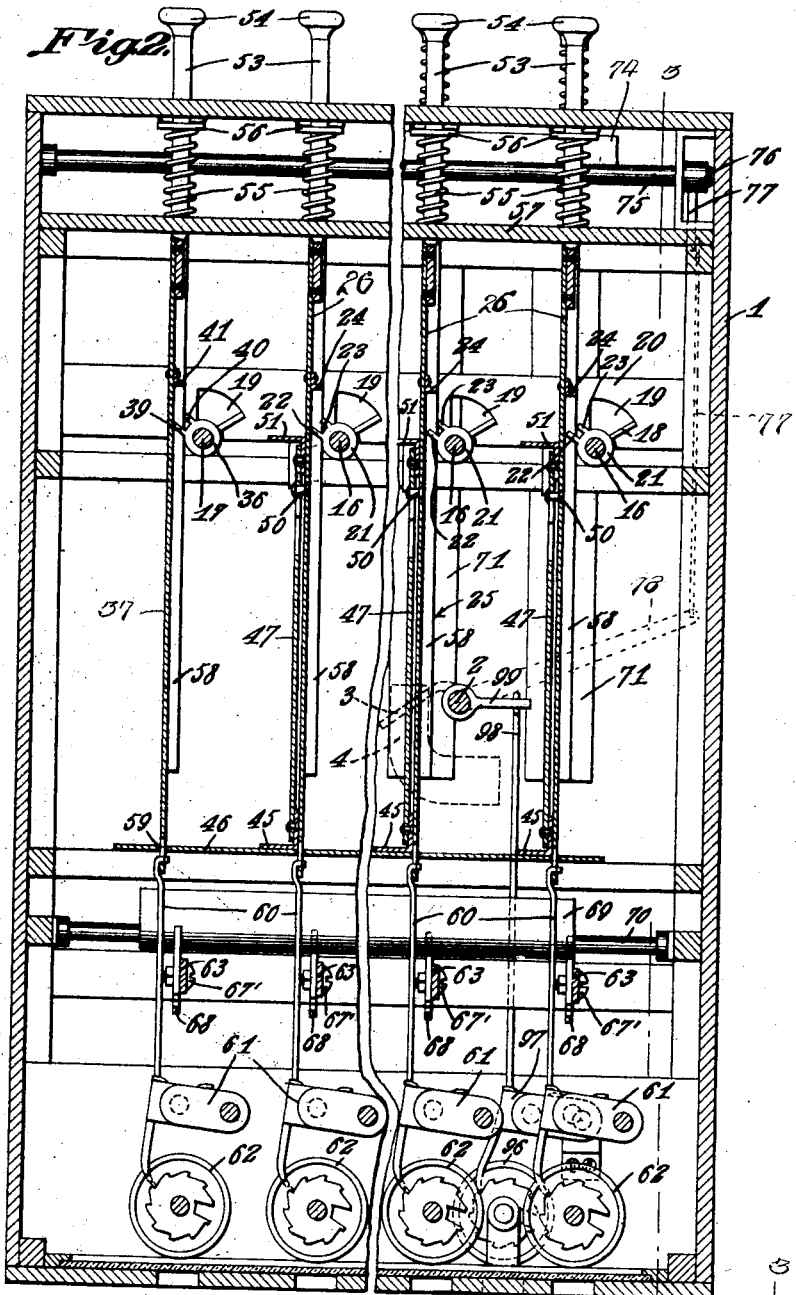
Fig. 2 is a longitudinal section taken on the line 2—2 of Fig. 3.

Referring particularly to Figs. 1 and 2. Journaled in the casing 1, and extending transversely thereof, is a horizontally disposed rock shaft 2 one end of which projects beyond the casing. A crank lever 3, by which the mechanism is set, is secured on the shaft 2 at its projecting end, and the lever is adapted for engagement with a latch 4 which is secured to the casing 1. On the other end of shaft 2 is secured a crank 5 the pin of which pivotally engages one end of a link 6, the other end of which is pivoted to a horizontally disposed reciprocating bar 7, which is placed longitudinally of the machine. Bar 7 is formed with end lugs 8 which are slidably supported in brackets 9, which brackets are carried by the casing 1. Pivotally secured to the bar 7 are similar dogs 10 which rock vertically upon their pivot pins, and each of which is held in normal or raised position by a resilienet element such as the leaf springs 11 one end of each of which is secured in a bracket 12 while the other end contacts with the lower edge of the dog. While these dogs 10 may be of any convenient design, they are here shown of roughly triangular shape and formed with an outstanding flanged portion 13 at the upper corner, which portion forms the contact part of the dog. Each dog is also provided with a vertical slot 14 through which passes a pin 15 which pin is secured to the bar 7 and serves to limit the throw of the dog.

Figure 3:
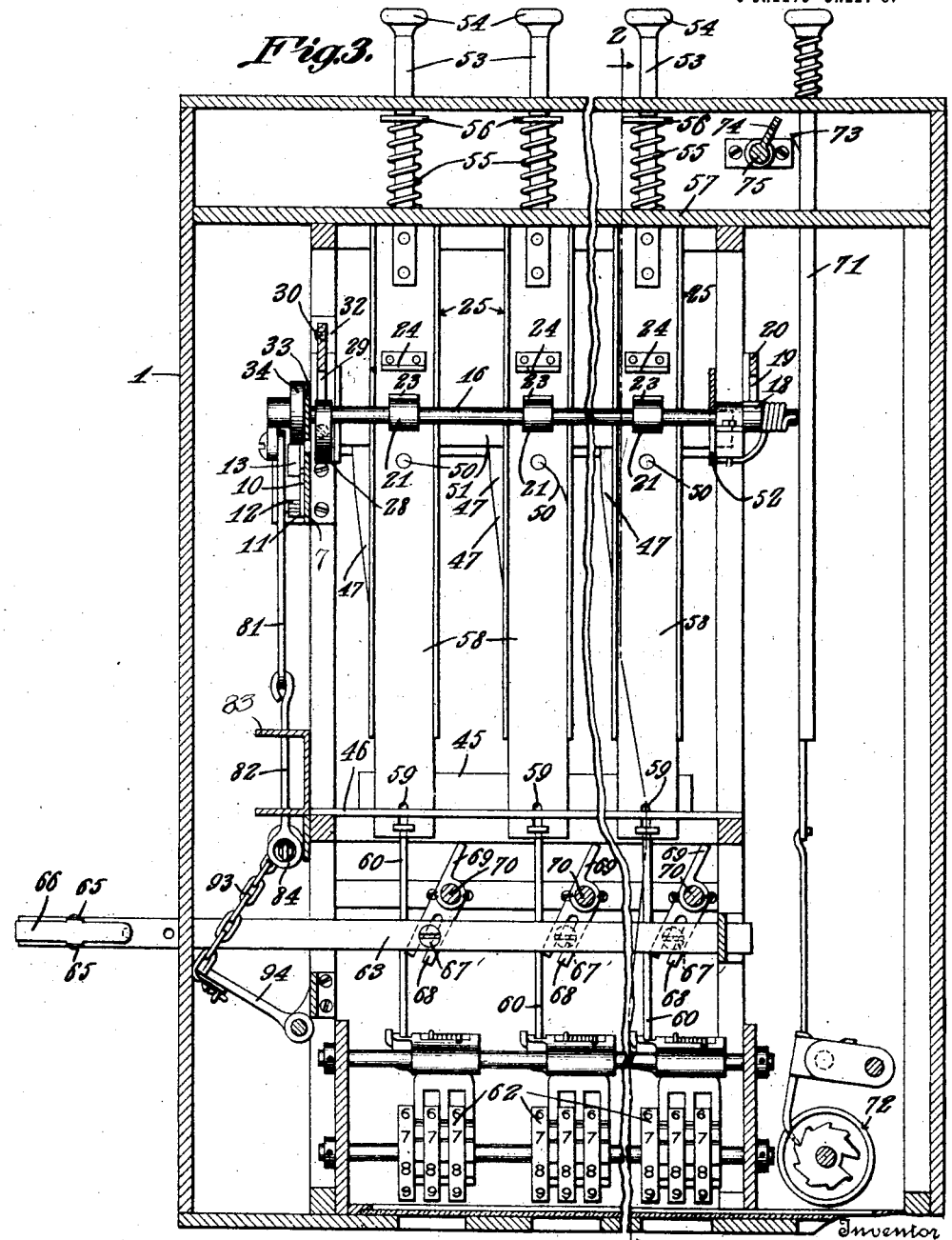
Fig. 3 is a transverse vertical section taken on the line 3—3 of Fig. 2.

Referring now more particularly to Figs. 1, 2, and 3. Journaled in suitable supports within the casing 1 are similar, horizontally disposed, transversely extending shafts 16, and a shaft 17. Each shaft 16 has a radially extending arm 18 secured at one end thereof, and the arm oscillates within a segmental opening 19 which is formed in a plate 20. This arm 18, oscillating within the opening 19, serves to limit the rocking motion of the shaft 16.

Secured at suitable intervals along each shaft 16 are short sleeves 21 each of which is formed with outwardly extending, spaced longitudinal ribs 22 and 23. The rib 23 extends outwardly for a less distance than the rib 22, as shown. The ribs 22 are positioned to be actuated by lugs 24 which extend from the plungers 26. The purpose of this action will appear as the description proceeds.

Secured on each shaft 16 adjacent its other end, is a cam 28, which is positioned to take into and contact with the front edge of a cut-in 29 formed in a bar 30. The bar 30 is horizontally disposed and positioned longitudinally of the machine, and is formed with end lugs 31 by which it is slidably supported in brackets 32, which brackets are secured to the casing 1. This end of each shaft 16 is journaled in a support 33, secured within the casing, and extends beyond the support. A collar 34 is secured on this extending end of each shaft 16 and is formed with a nose 35. As will be seen especially in Fig. 1, the collar normally lies in such a position that the nose 35 will not contact with the dog 10 when the bar 7 is drawn forward, but will depress the dog and latch against its upper forward corner if the shaft 16 is rocked while the bar 7 is in its thrown position.

The shaft 17 has secured thereon the spaced sleeves 36, similar in all respects to the sleeves 21 just described, and serving the same purpose with respect to plungers 37 that the former sleeves did with respect to plungers 26. The sleeves 36 are formed with the longitudinal spaced ribs 39 and 40, similar to the ribs 22 and 23 respectively. Each plunger 37 is provided with a lug 41 adapted to contact a rib 39 of one sleeve 36. One end of the shaft 17 is journaled in the support 33, and there is secured on the shaft adjacent this support, a radially extending angular arm 41', the angularly disposed outer end of which extends within a cut-out 42 provided in the sliding bar 30. As will appear from Fig. 4, rocking the shaft 17 from normal position will throw the angled end of arm 41' against the rear edge of cut-out 42 and lock the sliding plate 30 in its rearmost position. A collar 43 is secured on this end of the shaft 17, and the collar is formed with a nose 44 adapted to latch against the rear dog 10 as heretofore described in relation to collar 34 and its nose 35.

From the preceding it will be apparent that when lever 3 is thrown up and caught on latch 4, shaft 2 is rocked and crank 5 thrown. This motion will through link 6, draw the slide bar 7 forward and place forward and rear dogs 10 beneath the collars 34 and 43 respectively. With the parts in this position it is apparent that, should a plunger be depressed to cause its lug to contact with a rib 22 or 39, the respective shaft 16 or 17 will be rocked and cause the nose 35 or 44 to depress and pass its dog 10 and latch against the same. We would then have either a shaft 16 or the shaft 17 locked in rocked position by a dog 10 and one plunger depressed and locked in depressed position because by depressing a plunger and bringing its lug into contact with a rib 22 or 39 and rocking the shaft the other rib 23 or 40 as the case may be, will be brought into position overlapping the lug and will retain the lug as long as the dog locks the shaft, which will be until the lever 3 is released from the latch.

The depression of any plunger 26 will rock shaft 16 and, through cam 28, will throw bar 30 forward. This will bring the rear edge of cut-out 42 against the end of arm 41 and will prevent the rear shaft from being rocked while a shaft 16 is in rocked position. Similarly, when the shaft 17 is rocked the end of arm 41' contacts with the rear edge of cut-out 42 and prevents the plate 30 from sliding forward while the shaft is held in rocked position. This will prevent the cam 28 entering the cut-in 29 and, consequently, keep each shaft 16 from rocking.

Having described the mechanism which prevents one shaft being rocked while another is in its rocked position, a consideration of the mechanism which prevents two plungers in the same series, that is, operating the same shaft, from being depressed at the same time, will be had. Attention is invited particularly to Fig. 8.

Angle bars 45 are secured to the support 46 through which the lower ends of plungers 26 reciprocate. Pivotally secured to the upstanding webs of each angle bar 45, at a point directly behind each plunger, is an oscillating plate 47. As these plates are exactly alike, only one will be described. The plate 47 extends upwardly from the bar and has a triangular opening 48 formed near its upper end, which opening merges into a depending longitudinal slot 49. A pin 50 extends from the plunger and through the opening 48 in which it normally lies. When the plunger is depressed the pin enters the slot 49 in which it has a close sliding fit. One of these plates 47 is provided for each plunger and the upper ends of the plates are pivotally connected to a sliding bar 51 which extends transversely of the machine and is supported in suitable brackets 52. The pivot point of the lower end of each plate 47, and the pin 50 are in vertical alinement. The slot 49 has its longitudinal axis coinciding with the longitudinal axis of its plate, but the pivot points of the upper ends of the plates 47 are so spaced that when the slot 49, pin 50, and lower pivot point of one plate 47 are in alinement, the like elements of every other plate will be out of alinement. It is evident then, that when one plunger is depressed and its pin 50 enters the slot 49, no other plunger can be depressed, because its pin is held out of alinement with its slot. This, then, prevents two plungers in the same series being depressed at the same time.

Having seen how each plunger may be depressed and cause the mechanism to lock against the depression of another plunger, consideration will now be had of the structure of the plungers and their object.

Each plunger rises through the top of the casing 1 and is formed with a stem 53 surmounted by a thumb knob 54. The stem 53 is surrounded by a coiled spring 55 which is confined between a collar 56 secured on the stem, and a division plate 57 secured within the casing 1. Each stem extends through the division plate 57 and a channel bar 58 depends from each stem. The side flanges of the channel bar 58 are cut away for a short distance at its lower end, and this end is slidable in a slot formed in the support 46 through which it extends. A longitudinal slot 59 is formed in the lower end of each channel bar 58 and in the slot slides one end of a connecting rod 60 the other end of which is connected to the pawl 61 of an indicator 62. As is evident, each depression of a plunger operates an indicator to register once. It is also evident that because of the slot 59 in which the connecting rod 60 slides, considerable depression of a plunger must be had before a register will be actuated.

Figure 7:
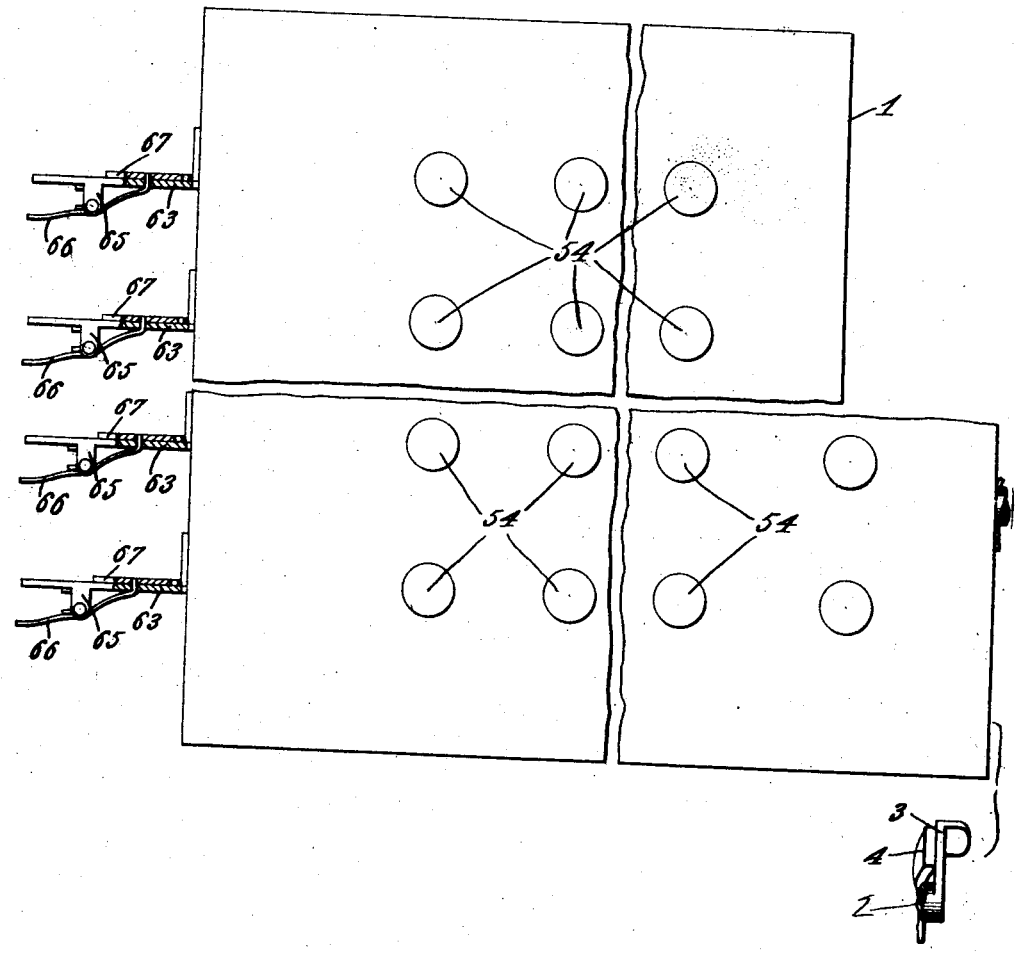
Fig. 7 is a top plan view of the machine, parts being broken away.

As it is sometimes desirable to know the vote by party, provision is made for registering the party vote as follows: reference being had particularly to Figs. 2, 3 and 7.

Similar bars 63 extend transversely of the casing in which they are slidably mounted, and extend beyond the casing at one end. To the extended end of each bar is secured a suitable gripping member, which in the present instance consists of ears 65 on the end of each bar between which is pivotally hung a latch 66, the end of which is adapted to enter apertures formed in the bar and in a bracket 67 which is secured to the casing 1 and extends along the extended end of each arm. This latch serves to lock each bar in its in or out position. Each bar has pins 67' which take into bifurcated arms 68 extending from a rocking plate or vane 69 which is mounted on a shaft 70. Each plate 69 can be rocked under the edge of the corresponding plungers on different rows, and when in such position locks the plungers against depression. This is their normal position. When one registers a vote the plungers corresponding with the party under which the vote is cast must be unlocked by pulling out the proper rod. These rods may, if desired, be connected with separate registers.

From the foregoing it will be understood that the plungers 37, which are located in the first transversely extending row, and which rock the shaft 17, are utilized when voting a straight ticket, while the plungers 25 are for voting a split ticket. It is also apparent that the plungers in a row extending longitudinally of the machine are devoted to the candidates of one party, and that each longitudinal row is devoted to a separate party.

Taking up now that part of the mechanism which is made use of in voting on local matters, and referring especially to Figs. 3 and 5; the voter registers his regular vote in the manner heretofore described and, if voting on local matters, presses one of the plungers 71, which are provided for the different local issues and each of which is connected to a register 72, one of which is shown in Fig. 3. Each plunger is held against further operation after depression by a spring latch 73 which is provided on each plunger and which catches against the edge of a vane 74 which extends from a shaft 75, which shaft rocks within the casing 1. A crank 76 is secured to one end of the shaft 75 and is pivotally engaged by one end of a connecting rod 77, the other end of which engages a crank 78 on the shaft 2. It will be seen that when the lever 3 is engaged by the latch 4, the vane 74 is revolved into position to catch the spring latches 73.

The remaining part of the mechanism, shown principally in Figs. 1 and 3, is of use when primary elections are held. Besides the regular ticket, there are often local boards to be voted for. In many instances there are a number of candidates for these positions and each voter is allowed to cast a ballot for a small number of such candidates, the candidates receiving the highest votes being nominated to fill the vacant positions. To provide for this the following structure is supplied:

A crank 80 is secured to the end of each shaft 16, and a connecting link 81 is pivotally engaged at one end by the crank pin. The link 81 extends downwardly and its lower end pivotally engages a rod 82. The rod 82 reciprocates vertically through suitable apertures formed in the side flanges of a channel bar 83 which extends longitudinally of the machine and is suitably supported in the casing 1. The lower end of each rod 82 is formed with an eye 84 and this end normally lies between eyes 85 which are secured in a support 86 which is mounted in the casing 1.

A flexible connection, here shown as a chain 93, passes through the eyes 85, and the eyes in the ends of rods 82. The ends of this chain are adjustably connected to lugs 94 which are suitably secured within the casing.

The operation of this mechanism is as follows: The chain 93 is passed through as many eyes 85 as there are candidates. The lever 3 is brought to position and caught on the latch 4. A number of plungers 25 are now pushed in equal to the number of candidates for whom a voter may cast a ballot. As each of these plungers is depressed it locks in depressed position as heretofore described. The chain 93 is now drawn to take up all slack and the ends secured to the lugs 94. This sets the mechanism ready for use. It is now evident that when a voter depresses plungers 25 to the number of candidates for whom he may vote, he can operate no further plungers as the slack in the chain has been taken up and the chain will consequently hold other plungers against depression.

Each time the lever 3 is thrown to set the machine a register 96 is operated by its pawl 97 which is connected, through a link 98, to a crank 99 which extends from the shaft 2. This operation registers the number of votes cast.

It is thought that the operation of the machine is fully brought out in the foregoing description, and that a special explanation at this point of its operation is superfluous.

Having described my invention, what I claim as new and desire to secure by Letters Patent is:

1. A voting machine, comprising a casing, plungers reciprocable within the casing, registers operable by the plungers, a manually set automatic lock secured within the casing, a shaft rocked by the depression of a plunger, means on the shaft for engaging the automatic lock to retain the shaft in rocked position, and means on the shaft for locking the plunger in depressed position.

2. A voting machine comprising a casing, plungers reciprocating in the casing, shafts journaled in the casing, means for rocking a shaft by the depression of a plunger, means for locking the rocked shaft in rocked position, and means operated by the rocked shaft for locking the other shaft against rotation.

3. A voting machine comprising a casing, plungers reciprocable within the casing, registers operated by the plungers, shafts journaled in the casing and rocked by the reciprocation of a plunger, means for locking a shaft in rocked position, means on the shaft for locking a plunger in depressed position, a cam on each shaft, and a sliding plate formed with openings into which the cams take to lock one shaft against motion when the other shaft has been rocked.

4. A voting machine, including a casing, plungers in the casing for manual depression therein, plates pivoted in the casing and oscillated by depression of a plunger, the said plates provided with slots, and pins carried by the plungers and adapted to enter the slots, the slots moved out of alinement with the pins when a plunger is depressed to lock the plungers against depression.

In testimony that I claim the foregoing as my own, I have hereto affixed my signature in the presence of two witnesses.

BENJAMIN W. GADDIS.

Witnesses:
  M. C. REWANE,
  L. R. FRANCIS.

Copies of this patent may be obtained for five cents each, by addressing the "Commissioner of Patents, Washington, D. C."